United States Patent [19]

Gibert et al.

[11] 4,165,568

[45] Aug. 28, 1979

[54] PROCESS FOR PUTTING PHASES IN CONTACT AND DEVICE FOR CARRYING OUT THE PROCESS

[75] Inventors: Henri Gibert; Jean-Louis Baxerres, both of Montpellier, France

[73] Assignee: Agence Nationale de Valorisation de la Recherche (ANVAR), Neuilly-sur-Seine, France

[21] Appl. No.: 852,481

[22] Filed: Nov. 17, 1977

[30] Foreign Application Priority Data

Nov. 17, 1976 [FR] France .................. 76 34846

[51] Int. Cl.² .................. F26B 3/08; F27B 15/00
[52] U.S. Cl. .................. 34/10; 34/57 R; 432/15; 432/58
[58] Field of Search .................. 34/10, 57 R, 57 A; 432/15, 58

[56] References Cited

U.S. PATENT DOCUMENTS

| 3,196,827 | 7/1965 | Wurster et al. .................. 34/57 A |
| 3,964,175 | 6/1976 | Sivetz .................. 34/10 |
| 4,043,049 | 8/1977 | Hedstrom .................. 34/10 |

FOREIGN PATENT DOCUMENTS

530977 8/1931 Fed. Rep. of Germany .
1363939 5/1964 France .

*Primary Examiner*—John J. Camby
*Attorney, Agent, or Firm*—Shlesinger, Arkwright, Garvey and Dinsmore

[57] ABSTRACT

A process for fluidizing a particulate solid and wherein the process uses an apparatus having a chamber with a fluid distributor at its base and containing at least one elementary compartment formed by a conduit having a cross-section "S", at least one obstacle at its base arranged symmetrically in relation to the axis of the conduit, each such compartment being fed with a quantity of the particulate product and with an upwardly flowing fluid, the particulate material being of at least 1 mm granulometry, the obstacle or obstacles of each cell being adapted to define an open inlet section "s" at its base for the fluid of a dimension given by $0.12 \leq s/S \leq 0.60$; each cell is fed with a quantity of a particulate product so that the level of the product at rest in the cell is at most equal to a limit value approximately on the order of the height of the obstacle, and each cell is fed with fluid such that the flow velocity at the point of section S is at least equal to the minimum fluidization value of the particulate product and is lower than the pneumatic transport velocity of the large particles being carried by the fluid.

20 Claims, 8 Drawing Figures

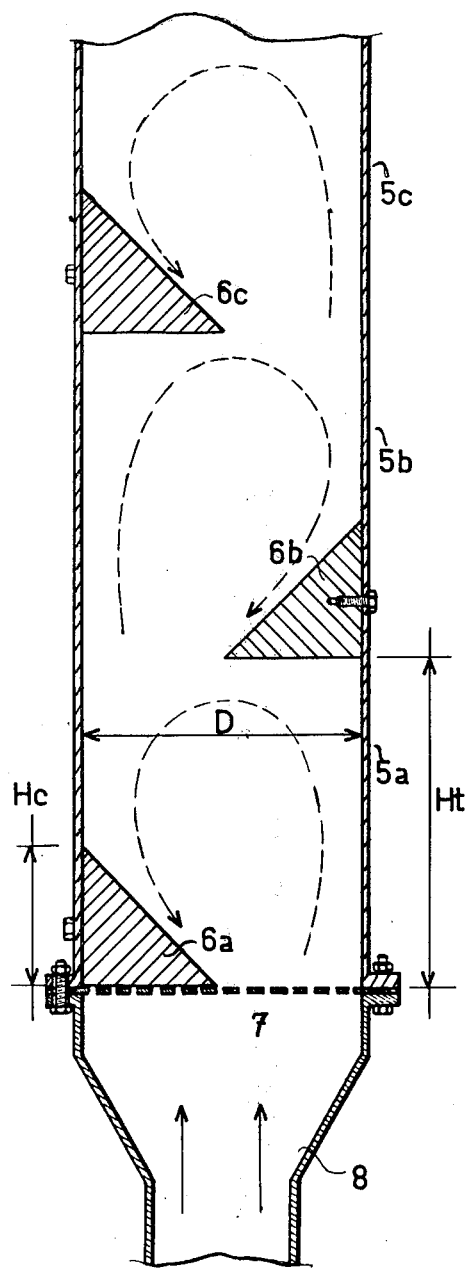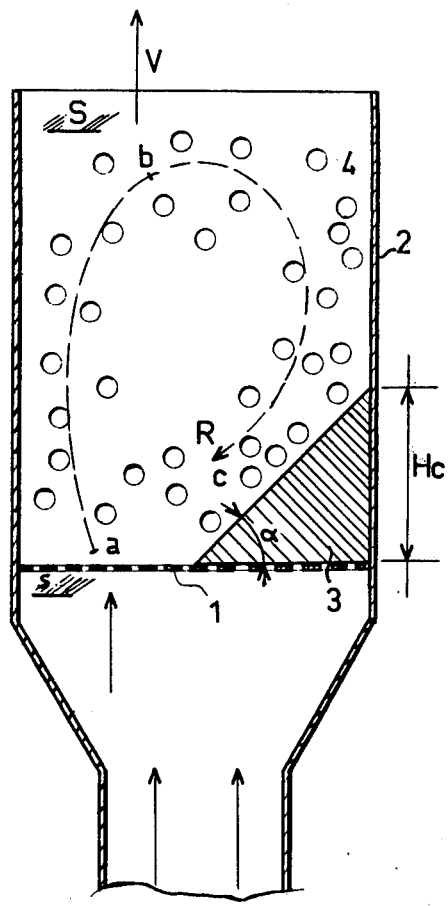

PROCESS FOR PUTTING PHASES IN CONTACT AND DEVICE FOR CARRYING OUT THE PROCESS

The invention relates to a process for putting phases in contact, in which one or more phases, each constituted of a solid product in particle state in the form of large particles, are placed in suspension and in natural circulation in a fluid phase. The invention is also extended to a device to carry out this process, and to particular applications such as the realization of homogenous mixtures of products which are in particles, or on the other hand the separation of particled products of different density, the attrition of a particled product, thermal treatment, and generally to operations for mass, heat and momentum transfer.

Today it is known to "fluidize" products in particle state in the form of small particles which are smaller than approximately 2 mm granulometry. The fluidization consists of putting the particles in suspension by passing a fluid through the bed of the particled product at a velocity greater than "minimum fluidization velocity", that being $V_{mf}$ velocity which characterizes the product in particle state; when the velocity of the fluid exceeds this value, the bed of the product swells and the particles are submitted to continuous and disordered movement. The bed then acquires properties analogous to those of a liquid and can then be at the point of extremely efficient exchanges with the fluid, particuarly thermal: this phenomenon is used in a number of industrial applications.

But today it is not known how to fluidize large particles, of which the granulometry exceeds 2 to 3 mm. Tests have shown that "pistons" of fluid are formed, which rise periodically in the bed which raises it up in its entirety: there is no longer good intimate contact between the fluid and the particles, and thus the specific advantages of fluidization are lost.

Two solutions have already been disclosed to remedy this difficulty. These solutions put a solid phase in particle state in contact with a gaseous phase, without true fluidization. The first solution consists of putting the product in a very thin bed, of height at the most equal to three times the dimension of one grain, this solution is cumbersome because it requires very large surfaces of apparatus and thus great fluid flow. Moreover, the exchanges are not as good as in the true fluidization, because a very low horizontal diffusion of the particles is observed.

The second solution consists of using "jet beds", obtained by creating a practically constant section chimney of fluid in the center of the bed, in which the particles mount at great speed in diluted phase; after being thrown out of the chimney, they fall back in dense phase along the walls. The jet beds do not satisfactorily resolve the problem, and they include the following faults: bad exchange within the bed, resulting from the nonuniformity of the bed (presence of a dense phase and a diluted phase together), poor use of the fluid, of which a part escapes at the head of the chimney without having been in true contact with the particles.

Additionally, the existence of two patents which describe analogous devices for carrying out the process to those used in the invention should be mentioned: French Pat. F. L. SMIDTH, No. 1,363,939, and German Pat. C. H. MOORE No. 530,977. But the processes described in these patents are very different from that of the invention and do not create a bed which is equivalent to a fluidized bed.

[French] Pat. No. 1,363,939 discloses a process of circulating fine particles (granulometry below 50 microns) from top to bottom by gravity in a gaseous current which is flowing at very high speed relative to the pneumatic transport speed of particles (on the order of 40 times greater). The fine particles are carried by the gas in a cyclone movement and projected against the inclined walls along which they slide downward. A diluted phase is obtained in the center of the cyclones and a dense phase along the walls, and the quality of the contact between particles and fluid is very medicore. Moreover, in these conditions it is not possible to have stationary function with neither feed nor draining off, because the particles accumulate rapidly in the bottom of the apparatus.

[German] Pat. No. 530,977 discloses a device in which a solid in particle state falls by gravity in cascade from the inclined stage to another, while a gas is transmitted at low speed through the base, for drying. The inclined stages act as deflectors which lengthen the fall of the particles to increase the time of contact with the fluid: There is no creation of a bed equivalent to a fluidized bed and this process thus does not benefit from the high quality of the contacts furnished by these beds. Moreover, stationary function with neither feed nor draining off is impossible in the conditions defined in this patent.

The present invention proposes to remedy the insufficiencies of the known processes of fluidization in the case of large particles of which the granulometry is at least equal to 1 mm.

One object of the invention is to permit one or more solid products in particle state in the form of large particles to be put in suspension and in natural circulation in a fluid, in order to assure an intimate contact between the phases and to recover the traditional advantages of fluidization as used in industry.

Another object is to permit synchronized function for unlimited lengths of time while the large particles remain in suspension in the fluid with a nearly uniform density.

Another object of the invention is to allow choice of the direction of circulation of the particles relative to the fluid both in co-current circulation and in counter-current circulation.

The process according to the invention is:

to use a chamber with a fluid distributor at its base and containing at least one elementary compartment called a "circulation cell", wherein this cell is formed by a conduit having a cross-section S which has at least one obstacle at its base which is arranged asymmetrically relative to the axis of the conduit and of which the top is inclined in relation to the horizontal at an angle (alpha) at least equal to the natural slope angle of the particled product, and the obstacle or obstacles of the cell are adapted to define an open area s of $0.12 \leq s/S \leq 0.60$ for inlet of the fluid;

to feed each cell a quantity of particled product up to the level "h" of the product when at rest in the cell, so that the level "h" is at the most equal to a value which is very approximately on the order of the height $H_c$ of the obstacles;

to feed each cell fluid through its open area "s", at a flow of the velocity "V" of the fluid at the level of section "S", which is at least equal to the minimum fluidization velocity "$V_{mf}$" which characterizes the particled product, and is below velocity "$V_t$" for pneumatic transport of the large particles of the product by the fluid.

FIG. 1 shows a transverse cross section of a basis cell during function, distributor 1 is shown below the fluid flow inlet, the conduit 2 of S cross section which forms the cell and, at its base, the obstacle 3 on one side of the conduit with top surface inclined at an angle (alpha) in relation to the horizontal; the particles 4 have a granulometry greater than 1 mm.

When the fluid flow attains a value such that its velocity V in conduit 2 of S cross section becomes greater than $V_{mf}$ and still remains lower than the velocity $V_t$, it is established that the particles are subjected to a swirling circulation in the direction of arrow R; this movement results in:

on the one hand, a pneumatic drive effect in the zone a-b, with reduction of the velocity of the particles in proportion to the rise (because the velocity of the fluid is itself reduced due to the enlargement of the section in the area of the obstacle from the inlet section area s to the section S);

on the other hand, a phenomenon of drop of the particles into the zone b-c above the obstacle because of the carrying effect of the fluid, which has been reduced.

Thus a bed is obtained which is equivalent to a fluidized bed, in which each particle is in dynamic equilibrium within the fluid and floats in this fluid, with a nearly uniform density of particles.

The velocity conditions are essential to obtain this result. A speed below minimum fluidization $V_{mf}$ generates no "circulation" and the particles simply fall under the effect of their weight to the bottom of the cell, without acquiring the various advantages of the fluidization, to be mentioned hereinafter. If the velocity is greater than the oneumatic transport velocity $V_t$, then instability occurs, and the particles are drawn in diluted phase out of the cell.

The minimum fluidization velocity $V_{mf}$ and pneumatic transport velocity $V_t$ of a product divided into particle form are the characteristic parameters of this product which are known by a technician in the art for most products. Thus, for a body subdivided into large spherical particles, the pneumatic transport velocity $V_t$ is on the order of 9 times greater than its minimum fluidization velocity $V_{mf}$.

The flow of the fluid is preferably adjusted such that the velocity V of flow in section S is between 1.5 $V_{mf}$ and 2.5 $V_{mf}$. Experiments have shown that within this optimum interval, the swirling movement of the particles is effected in good conditions and remained stable without risk of formation of "pistons".

In excess of the top limit of this interval, pistons begin to appear, causing a certain instability of the top interface of the bed and the rotation of the particles is somewhat braked by their multiple impacts against the walls of the cell.

The relationship s/S is also predetermined to permit a stable swirling with intimate contact of the phases; beneath an approximate value of s/S=0.12, the fluid has too great a velocity at the point of the obstacle and forms a chimney in which the solid is transported in diluted phase. This leads to a "jet bed" and the aforementioned inconveniences. In excess of approximately 0.60, the effect of the obstacle is too slight to generate formation of a swirl and the traditional problems of fluidization of large particles are met again.

Moreover, it has been shown that the swirling movement could not be established when the quantity of the products was too great in the cell; in practice, it suffices to limit the level of the product (when at rest in the cell) to the level $H_c$ of the obstacle in order to obtain good results.

Additionally, according to the process of the invention, the angle (alpha) of incline of the obstacle is adjusted to a value greater the angle of natural slope of the product. This arrangement eliminates any risk of accumulation of particles at the right side of the obstacle.

The various values of the parameters herein indicated, which characterize the process, were obtained experimentally and are of course to be considered approximate. The process is to allow the recovery of all of the advantages of fluidization when dealing with large particles, and particularly;

an excellent heat or mass transfer coefficient between the fluid and particles because of the intense turbulence which is present within the bed and in its entirety;

a suspension of all the particles of the bed without either dense or stationary zone.

This last property has been confirmed experimentally by recording the loss of force of the fluid through the bed of particles: as in the fluidization phenomenon, this loss of force is approximately equal to the weight of particles per unit of flat section of the cell (on the other hand, in the "jet beds", the loss of force of the fluid is customarily lower than the weight of particles per unit of flat section of the column, which shows that all of the particles are not in suspension).

According to one characteristic of the process, cells are used of which the dimensions along three axes are each at least equal to ten times the mean granulometry of the particle product. Thus the effect of the wall which brakes the swirling movement of the particles is limited.

In order to put products of which the natural slope angle is less than 45° into suspension and in circulation, the s/S relationship of the open section to the cell section is properly set at approximately ¼, and the angle (alpha) of inclination of the obstacle is on the order of 45°. Thus the cell presents a particularly favorable geometry for establishing a uniform swirling movement.

The above advantages allow the process according to the invention to be used un many applications where the products are in particle state in the form of large particles. The transverse section of each cell can be of different form dependent upon function: cylindrical form with obstacle in the form of a cylindrical guard, parallelipiped form with obstacle in the form of a right angle prism; annular form with obstacle in the form of an annular guard, etc.

It is possible to use a chamber with one single circulation cell or, on the other hand, one chamber containing several cells. If several cells are used, the cells can be superposed one over the other to form a vertical column, and the fluid passes successively from one cell to the other from the bottom to the top.

The cells can also be juxtaposed against each other at the same level, and fed fluid on the parallel.

It is also possible to combine the two fixtures to obtain a chamber of several stages, each formed by several juxtaposed cells.

The following description is in reference to the attached drawings, which are nonlimiting examples of the apparatus for illustration of the process according to the invention.

FIG. 1 is a diagram of a transverse cross section of a basic cell.

FIG. 2 is a transverse cross section diagram of a column with several superposed cells.

The column shown in FIG. 2 is composed of several circulation cells 5a, 5b, 5c, etc... superposed one over the other; each cell has one single obstacle 6a, 6b, 6c, etc. arranged asymmetrically on one side of the obstacle and extending to its side wall. If the column is cylindrical, this obstacle is constituted of a cylindrical guard, and if the column is parallelipiped, the obstacle is a right angle prism extending from one end to the other of the column. The obstacles of the cells are arranged in staggered arrangement so that the swirling particles move in opposite directions in two contiguous cells. In the embodiment shown, these obstacles block half of the column and their top surface is inclined 45° from the horizontal.

At the base of the column, a grid 7 acts as fluid distributor and blocks the passage of the particles of the solid product in a passage 8 through which the fluid arrives, for example air, flowing for example at flow velocity on the order of 2 $V_{mf}$ at the level of the flow section of each cell. So that the particles will be distributed in the cells without direct pneumatic transport effect, and without "piston" effect, the height $H_t$ of each cell from its inlet section to the one of the next upper cell is approximately between the height $H_c$ of its obstacle and a limiting value on the order of 2D (if D is the smallest dimension of the column on a horizontal cross section plane: diameter or width). A value $H_t$ on the order of 1.2 D to 1.5 D gives excellent results. The D dimension is greater than ten times the mean granulometry of the particles being processed.

The column with superposed stages can be applied when maximum reduction of the quantity of fluid required to put the solid product into suspension and circulation is desired, or if the greatest part of the fluid flow is to be drawn off (lowering the temperature of the fluid in the thermal exchanges as far as possible, forced extraction of one component in separation processes, etc....). This is the optimum configuration for saving energy.

This column can be used to function continuously and can also be used both for co-current fluid-particle processing and for counter-current fluid-particle processing.

Figure 3:
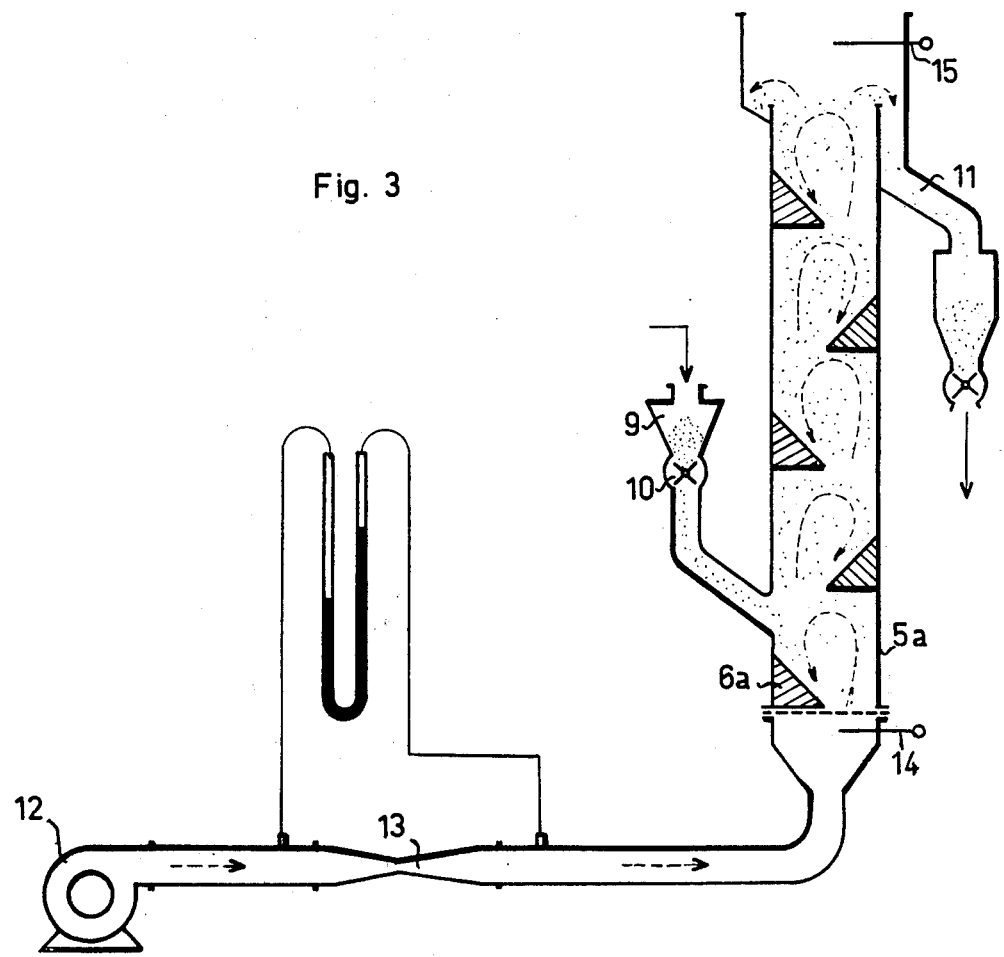
FIGS. 3 and 4 show two possibilities of continuous use of this column.

FIG. 3 is a diagram of an installation where the process is carried out in co-current. The cells are fed by continuous injection of the particled into bottom cell 5a over its obstacle 6a, and by degrees, by transport from one cell to the next overhead.

Thus the product is put into swirling motion in the bottom cell and a statistical passage of the particles occurs upward to the upper cells.

The product can be drawn off continuously in the top cell after treatment.

In FIG. 3, the feed is effected from a hopper 9 with a dosing valve 10, and the discharge is effected by removal from the head of the top cell in a conduit 11. The fluid is conveyed by pressure element 12 at the suitable flow; this flow is measured by measure of the loss of force in a Venturi 13. For thermal exchange between fluid and particles, thermometers 14 and 15 are placed at the inlet and at the discharge of the fluid to show the quantity of heat exchanged. The best yield is obtained by regulation of the fluid flow around the aforementioned values and by regulation of the flow of the injected product subdivided into particles.

It has been established by observation that the time for the product to remain in the column is better controlled with a large number of stages The mean value of the time to remain in the column is proportionately lower with a larger number of stages. This mean value is approximately equal to the ratio of the total volume of the bed to the volume flow of the feed of solid product.

Figure 4:
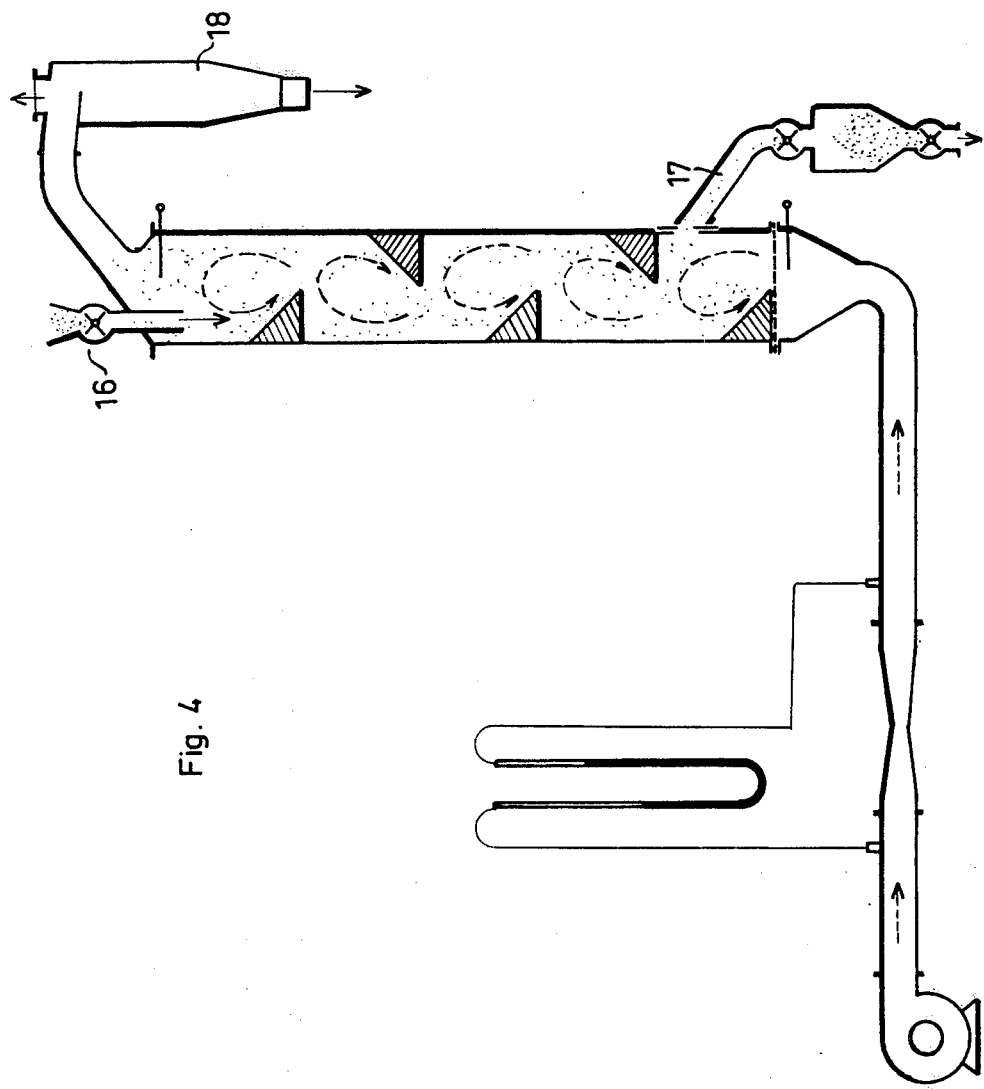

FIG. 4 is a diagram of an installation wherein the processing of the particles is effected in counter-current in relation to the fluid. The feed of the cells of the particled product is by continuous injection of the product into the top cell to the right of the obstacle (hopper 16) and, by degrees, by the effect of gravity from one cell to the next lower cell.

In applications for separation of the particles products (which are mentioned herinafter), a cyclone 18 can be provided at the head of the column to collect the lower density particles.

Figure 5:
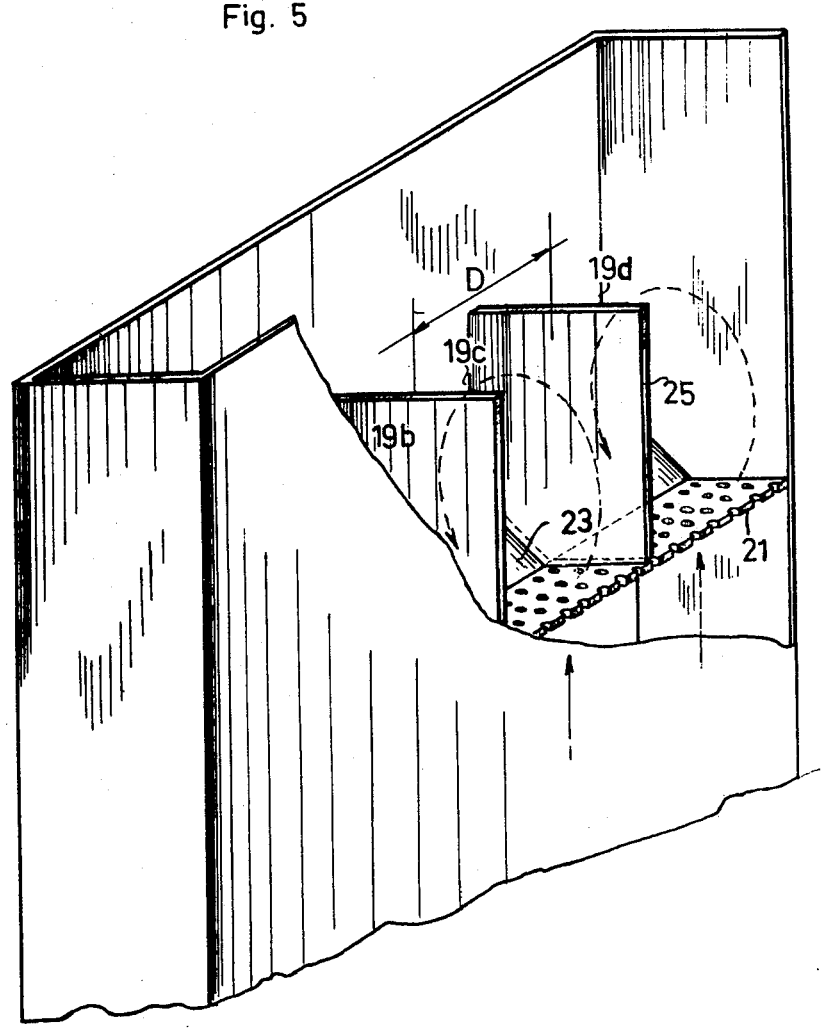
FIG. 5 is a perspective diagram with partial cutout of a chamber with several juxtaposed cells.
Figure 6:
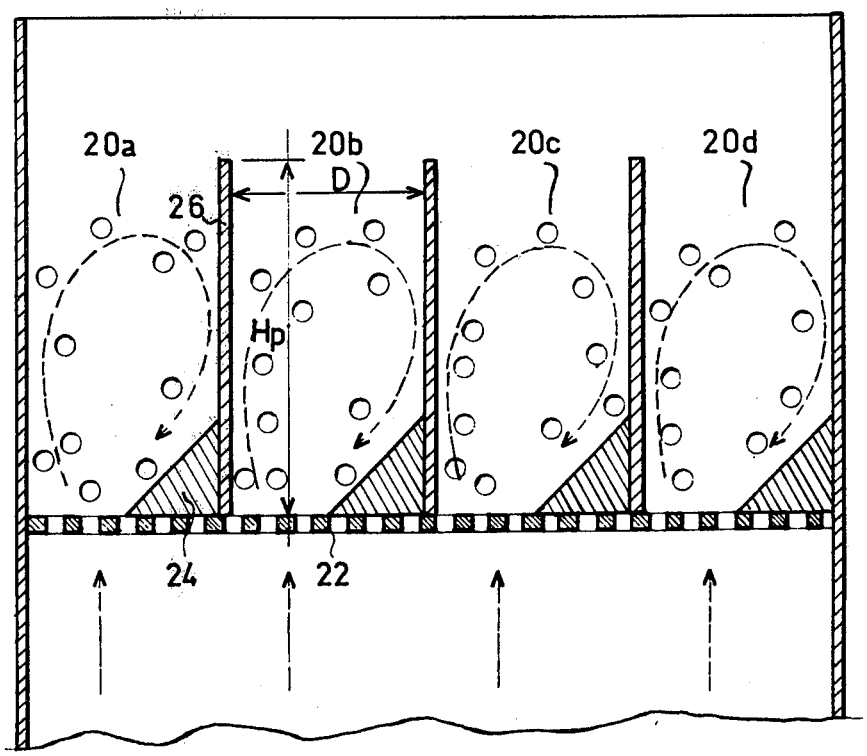
FIG. 6 is a diagram of a transverse cross section of another chamber with several juxtaposed cells.

Also, FIGS. 5 and 6 show two variations of chambers with cells juxtaposed one against the other 19a, 19b, 19c ... or 20a, 20b, 20c, etc.... These cells are fed in parallel with fluid through a distributor 21 or 22 through their inlet section which is essentially at the same level.

In the embodiment of FIG. 5, the obstacles 23 of the cells are constituted of a right angle prism which extends along the large dimension of the chamber.

In the embodiment of FIG. 6, the obstacles 24 are constituted of several right angle prisms arranged parallel to each other in the cells. It is to be noted in another variation, the obstacles can be back-to-back, two by two. Also, the different configurations can be combined in one stage to obtain one chamber extending horizontally in two perpendicular directions.

For each of the configurations in the diagrams, the swirling movements of the particles have been shown in an arrow.

So that the particles are distributed in the cells by over-flowing from one cell to another, the separation walls such as 25 or 26 are of $H_p$ height, between $H_c$ of the obstacles and a limit valve on the order of 2D (D being the smallest dimension of the cell along a horizontal cross section plane).

The described chambers and particularly the chamber of FIG. 6 can be used to function continuously, and the processing of the particles is effected from the cells on one side to the cells on the opposite side.

Figure 7:
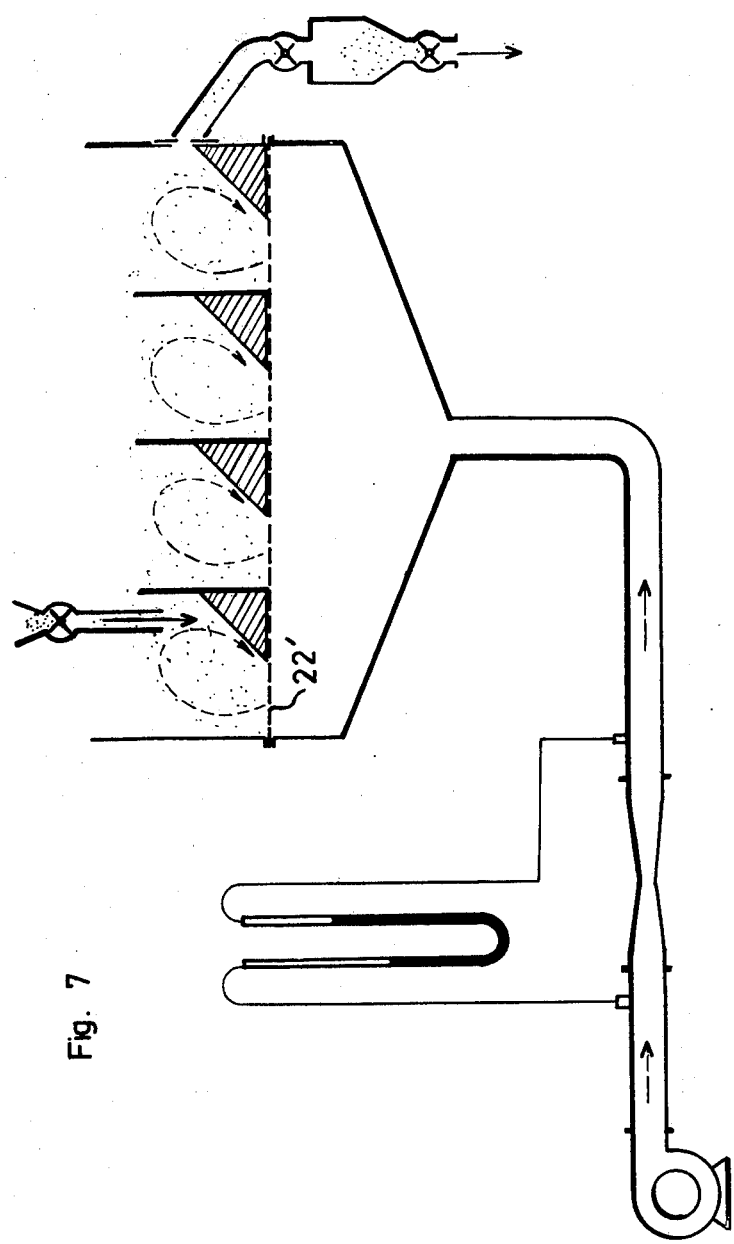
FIG. 7 shows one possibility of continuous function of the chamber of FIG. 6.

FIG. 7 is a diagram of an installation wherein the processing is effected from the left to the right. The feed of the particulate product into the cells is realized by continuous injection into at least one cell situated on one side of the chamber and, by degrees, by the over flowing over the separation walls of the cells. The particulate product is drawn off continuously in at least one cell which is situated one the opposite side from the feed cell. The feed and the drawing off can be realized by the type of elements described above.

The fluid feed is realized through distributors 22' at the point of the inlet sections of the cells and adapted to introduce a greater loss of force than the threshold corresponding to the weight of particles by unit of flat section of a filled cell. Therefore at the beginning of the process, the development of preferential fluid passages in the cells which are not yet filled is reduced; moreover, such a distributor guarantees better uniformity of function of the cell units in the course of the process.

Figure 8:
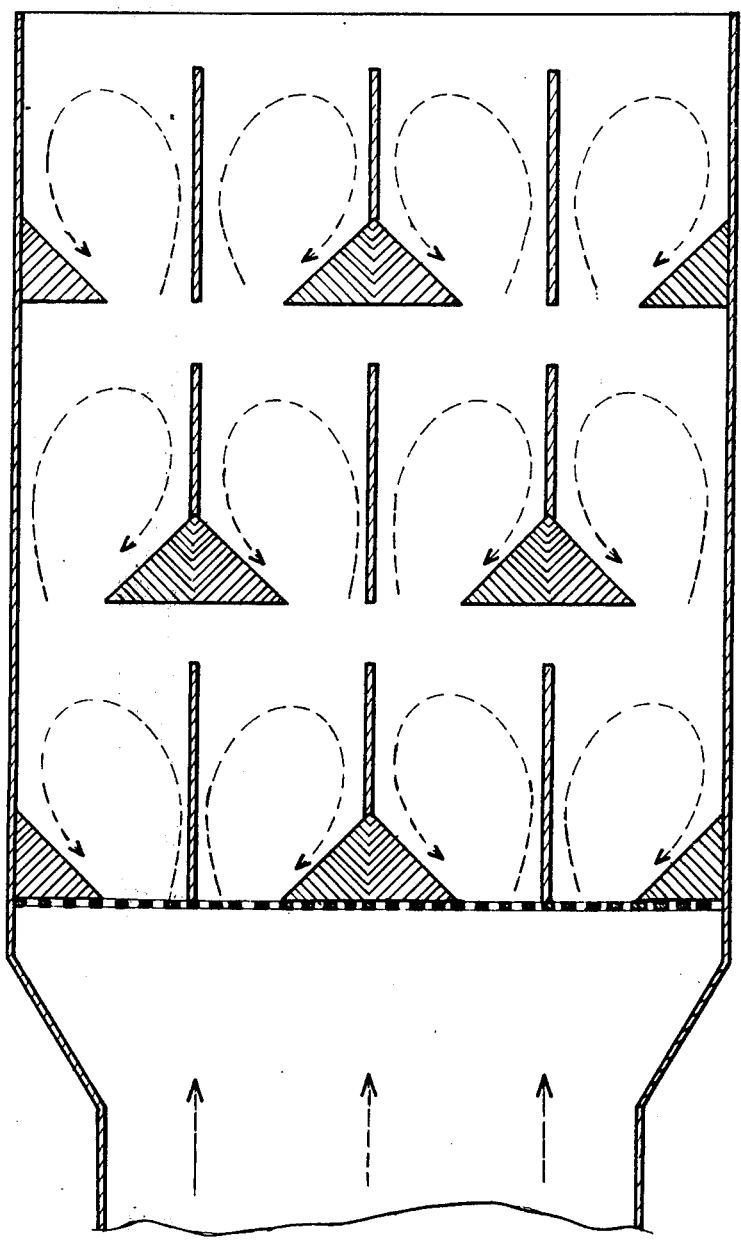
FIG. 8 is a diagram of a transverse cross section of a chamber with several superposed and juxtaposed cells.

FIG. 8 is a diagram of a chamber for a plurality of circulation cells analogous to those described, which are both superposed and juxtaposed in a tridimensional configuration.

Some applications are indicated in the following as nonlimiting examples; the particled products are in all cases products with large particles of granulometry at least equal to 1 mm.

EXAMPLE 1

The process can be carried out to realize a homogenous mixture of at least two products of different nature.

The fluid flow is then adjusted to such a value that its velocity V in section S of the cells remains lower the pneumatic transport velocity of all of the products; thus a perfect mixture of all of the products is obtained, even if they have different physical characteristics (diameter, form, etc.).

EXAMPLE 2

The process can also be carried out for separation of two products of different density.

The fluid flow is then adjusted to a value such that its velocity in section S of the cells is higher than the velocity of pneumatic transport of one product and lower than the velocity of drive of the other product. The first product is then progressively carried by the fluid, while the other remains in swirling movement in the cells.

EXAMPLE 3

The process can also be used to realize attrition of a product in particle state.

By one means of carrying out the process, the walls of the cells are covered with an abrasive covering which generates the attrition of the particles by successive impacts against the walls.

By another means of carrying out the process, an abrasive product in subdivided state is mixed with the product to be treated in order to generate the attrition by impacts of the particles with each other.

EXAMPLE 4

The process can also be used to carry out a thermal treatment of a particled product, wherein the fluid is at suitable temperature to realize said treatment.

In food industries, this thermal treatment can be quick-freezing, blanching, cooking, sterilization, roasting, etc.

Hereinafter are provided the characteristics of function of a pilot installation for blanching peas; the fluid is constituted of a gaseous mixture of air and vapor, in proportion to obtain a temperature on the order of 85° C. The peas have a granulometry of between 6 to 10 mm.

The characteristics of function are the following for the column of one single cell of 10 cm diameter and 25 cm height.

treatment capacity = 6 kg/hr vapor consumption = 1 kg/hr air compressor pressure: 0.5 bar.

The specific advantages of the process are the following: uniformity of treatment of the grains whatever their granulometry, good results from the operation as compared with the traditional processes because of the excellent thermal transfer between the fluid and the grains, capacity for continuous function, no alteration of the texture of the grains, possibility of lowering the operating temperature to relation to the temperature of the traditional processes, reduction of the quantity of effluent liquids.

EXAMPLE 5

The process can also be carried out to realize simultaneous operations for material and heat transfer. Drying of solid products or even liquids is the example of the type of process. Drying tests utilized on rice samples have shown that, besides the reduction of the operating temperature and the time of treatment in relation to traditional technology, this process avoids formation of agglomerates with the grains adhering to each other.

It is also possible to foresee drying of liquid or semi-liquid products (milk, clay . . .) by injecting them directly into a bed constituted of inert particles.

What is claimed is:

1. A process for putting phases into intimate contact wherein at least one of the phases is in the form of a particulate solid and at least one other phase is a fluid comprising:

providing a chamber having a fluid distributor at its base and including at least one circulation cell formed by a conduit having a cross sectional area S and at least one baffle at the base of said cell, said baffle being arranged asymmetrically in relation to the axis of said conduit and inclined from the horizontal at an angle at least as great as the natural slope angle of said particulate solid, said at least one baffle defining an opening into said cell having an area s defined by $0.12 \leq s/S \leq 0.60$, feeding into said cell said particulate product having a granulometry of at least 1 mm at a sufficient quantity so as to establish a maximum height of said product in said cell approximately equal to the height $H_c$ of said baffle, causing said fluid to flow through said opening into said cell at a velocity V at least equal to the minimum fluidization velocity $V_{mf}$ of said particulate product and less than the pneumatic transport velocity $V_t$ of said particulate product.

2. Process as in claim 1, wherein the flow of fluid in each cell is such that the fluid velocity V at the level of section S is between 1.5 $V_{mf}$ and 2.5 $V_{mf}$.

3. A process as in claim 2, wherein said cells have dimensions along the three axes at least equal to ten times the mean granulometry of said particulate solid.

4. A process as in claim 3 wherein said particulate product has a natural slope angle of less than 45°, said ratio s/S equals approximately 0.5, and said baffle is inclined at an angle of about 45°.

5. A process as in claim 1 including a plurality of said cells each having a single baffle arranged on one side of the axis of the cell and extending to the wall of the cell.

6. A process as in claim 5, wherein each of said cells has a height from the inlet section of the cell to the next cell above approximately between the height $H_c$ of its obstacle and a limit value on the order of 2D, when D is the smallest dimension of the column along a horizontal cross section plane.

7. A process as in claim 5 and wherein said chamber comprises a column having a plurality of superposed circulation cells, the baffles of which are staggered on opposite sides of said column, feeding said particulate product continuously into the lowermost of said cells co-current with said fluid, permitting said product to be transported through said cells and continuously removing said product from the upermost of said cells.

8. A process as in claim 5 and wherein said chamber comprises a plurality of said cells arranged in side-by-side relationship so that the inlets of each cell is at substantially the same level, and feeding said fluid to said cells in parallel.

9. A process as in claim 8, wherein said cells are separated by walls of $H_p$ height, which is between the height $H_c$ of said baffles and a limit value of approximately 2D, when D is the smallest dimension of a cell along a horizontal cross section plane.

10. A process as in claim 9 and including passing said product into said chamber from one side toward the opposite side, wherein the feed of the cells with said product is by continuous injection of said product into at least one cell situated on one side of the chamber and by overflowing over said walls into adjacent cells, and feeding said fluid through distributors situated at the level of the inlet sections to the cells and establishing a loss of force greater than the threshold corresponding to the weight of particles per unit of straight section of a filled cell.

11. A process as in claim 1 wherein said chamber is provided with a plurality of said circulation cells superposed above one another and juxtaposed in side-by-side relationship.

12. A process as in claim 1 and wherein said particulate product comprises at least two products having different pneumatic transport velocities, and causing said fluid to flow at a velocity V less than the pneumatic transport velocity of each of said products.

13. A process as in claim 1 and wherein said particulate product comprises at least two products having different pneumatic transport velocities, and causing said fluid to flow at a velocity V greater than the pneumatic transport velocity of one of said products and less than the pneumatic transport velocity of another of said products.

14. A process as in claim 1 and including subjecting said particulate product to attrition while in said at least one cell.

15. A process as in claim 14 and wherein the walls of said cells are covered with an abrasive coating for bring about said attrition by the successive impacting of said product against said walls.

16. A process as in claim 14 and including mixing a particulate abrasive with said product for bringing about said attrition by successive impacting of said product and said abrasive.

17. A process as in claim 1 and including subjecting said particulate product to a thermal treatment by means of said fluid at the desired temperature for said treatment.

18. A process as in claim 17 and including drying said product by means of said thermal treatment.

19. A chamber for putting phases into intimate contact, said phases including at least one particulate solid phase having a granulometry of at least 1 mm and at least one fluid phase, said chamber including a plurality of circulation cells, each formed by a conduit having a cross sectional area S and at least one baffle at the base of the cell, said baffle being arranged a symmetrically in relation to the axis of said conduit and inclined from the horizontal at an angle at least as great as the natural slope angle of said particulate solid, said at least one baffle defining an opening into said cell having an area s, the relationship between S and s being defined by $0.2 > s/S > 0.60$, at least some of said circulation cells being arranged in side-by-side juxtaposed relationship.

20. A chamber as in claim 19 and wherein at least some other of said circulation cells are superposed over said at least some of said cells.

* * * * *